(12) United States Patent
Aarts et al.

(10) Patent No.: US 7,610,356 B2
(45) Date of Patent: Oct. 27, 2009

(54) ACCESSING FUNCTIONALITIES IN HYPERMEDIA

(75) Inventors: Robert Aarts, Espoo (FI); Peter Dam Nielsen, Bronshoj (DK); Franklin Davis, Newton, MA (US)

(73) Assignee: Nokia Corporation, Espoo (FI)

( * ) Notice: Subject to any disclaimer, the term of this patent is extended or adjusted under 35 U.S.C. 154(b) by 1503 days.

(21) Appl. No.: 10/041,610

(22) Filed: Jan. 10, 2002

(65) Prior Publication Data

US 2004/0205156 A1 Oct. 14, 2004

Related U.S. Application Data

(63) Continuation-in-part of application No. 10/024,717, filed on Dec. 21, 2001, now abandoned.

(51) Int. Cl.
G06F 15/16 (2006.01)
G06F 17/24 (2006.01)

(52) U.S. Cl. .................. 709/218; 709/230; 715/200; 715/760; 715/781; 715/789

(58) Field of Classification Search .............. 709/203, 709/218, 219; 715/501.1, 513, 3; 707/10; 345/810
See application file for complete search history.

(56) References Cited

U.S. PATENT DOCUMENTS

| 6,070,175 A * | 5/2000 | Mezei .................... 715/500 |
|---|---|---|
| 6,114,978 A * | 9/2000 | Hoag ...................... 341/23 |
| 6,339,780 B1 * | 1/2002 | Shell et al. ............... 715/526 |
| 6,560,604 B1 * | 5/2003 | Fascenda .................. 707/10 |
| 6,674,453 B1 * | 1/2004 | Schilit et al. ............ 715/810 |
| 6,745,224 B1 * | 6/2004 | D'Souza et al. ........... 709/202 |
| 6,857,102 B1 * | 2/2005 | Bickmore et al. ........ 715/501.1 |
| 7,170,486 B2 * | 1/2007 | Lemel et al. ............. 345/156 |
| 2002/0154159 A1 * | 10/2002 | Day et al. ............... 345/738 |
| 2003/0018714 A1 * | 1/2003 | Mikhailov et al. ........ 709/203 |
| 2003/0126136 A1 * | 7/2003 | Omoigui .................. 707/10 |

FOREIGN PATENT DOCUMENTS

| CN | 1222242 | 7/1999 |
| WO | WO 97/49044 | 12/1997 |
| WO | WO 98/56159 | 12/1998 |

OTHER PUBLICATIONS

B.N. Schilit et al.;*m-Links: An Infrastructure for Very Small Internet Devices*; Proceedings of the 7th Annual International Conference on Mobile Computing and Networking; Jul. 16, 2001; pp. 122-131; New York, NY; Jul. 16-21, 2001 Rome, Italy.

(Continued)

*Primary Examiner*—Jude J Jean Gilles
(74) *Attorney, Agent, or Firm*—Alston & Bird, LLP

(57) ABSTRACT

A browser parses an XHTML document to identify links in the document that are marked up with the accesskey attribute and forms an options list containing the links, so that they can be selected independently of their position in the document.

35 Claims, 5 Drawing Sheets

OTHER PUBLICATIONS

O. Buyukkokten et al.; *Power Browser: Efficient Web Browsing for PDAs*; CHI 2000 Conference Proceedings: Conferenced on Human Factors in Computing Systems; Apr. 1-5, 2000; the Haque, Netherlands; Apr. 1, 2000; New York, NY.

S. Bjork et al.; *West: A Web Browser for Small Terminal*; UIST Proceedings of the Annual ACM Symposium on User Interface Software and Technology;1999; vol. 1, No. 1.

K. Sharp; *Five Keys to Converting WML Apps. To XHTML*; 2001; Internet Publication—Americans Forum Nokia http://americas.forum.nokia.com/articles/xhtml/wmltoxhtml.asp.

Netscape; *Netscape 4.61 Help Contents*; Sep. 24, 1998; Netscape Communication corporation; Section "Moving to Another Page".

H.Binkle et al.; *Extracting Links from HTML File*; Oct. 20, 1999; Internet Forum 'Online!'.

The International Search Repot for PCT Application No. PCT/EP02/14660; Date of Completion Sep. 1, 2003; Date of Mailing Sep. 17, 2003.

* cited by examiner

ACCESSING FUNCTIONALITIES IN HYPERMEDIA

CROSS-REFERENCE TO RELATED APPLICATION

This application is a continuation-in-part of U.S. patent application Ser. No. 10/024,717 filed on 21 Dec. 2001 now abandoned entitled "Accessing Functionalities in Hypermedia", which application is incorporated herein by reference in its entirety.

FIELD OF THE INVENTION

This invention relates to accessing functionalities in hypermedia and has particular but not exclusive application to displaying links independently of their location within a hypertext document.

DESCRIPTION OF THE PRIOR ART

Recommendations have been developed to provide a wireless application protocol (WAP) to promote common standards and specifications for data services that operate over wireless communication networks. For example, mobile devices such as telephone handsets can be WAP enabled to allow a user to access remote servers. Other mobile data communication services have also been developed such as i-mode. Data content is provided in a mark up language, similar to conventional hypertext mark up language (HTML), known as wireless mark up language (WML). This is configured to allow data to be displayed as a deck of individual cards which are of the size suited for display on the relatively small display screen usually available on a mobile device such as a mobile telephone handset or personal digital assistant (PDA).

The mobile device runs a browser to display data from the server and the user controls navigation between different decks and cards with keys on the mobile device. Typically, the mobile device has a smaller number of keys than a conventional personal computer and does not have a mouse, and so navigating with the browser of the mobile device gives rise to a problem in terms of ergonomics, in relation to the ease of browser controllability for the user. For example, the deck of cards may include a number of different links to different network locations, each specified by individual universal resource locator (URL). The user may have difficulty in locating the URLs provided in a particular deck of cards because they may be scrolled away from the currently visible content and so, hitherto, the browser has been configured to provide a list of such links separately from the display of the individual cards so that the user can operate an menu mechanism such as an "options list" in Nokia phones to select the list of links. This has the advantage that the user does not need to browse through the entire deck of cards to determine the links available. In the past, the provision of the options list has been achieved using the "DO" element. This is a conventional feature of WML, which as explained in more detail hereinafter, causes the user interface to perform predetermined user controlled functions. For a full description of the DO element, reference is directed to "Official Wireless Application Protocol" Wireless Application Protocol Forum Limited, Wiley, 1999 (ISBN0-471-32755-7) pp 87-89. In order to provide the options list, links that are marked with a DO element are provided in the options list. Then, having selected the list, the user can select an individual link from the list. Thus, the user does not need to browse through the entire deck of cards to identify the links contained within it.

Recently, it has been proposed to provide browsers compatible with XHTML rather than WML. XHTML is a development of HTML 4, and is described in XHTML 1.0: The Extensible Hypertext Mark Up Language (second edition)—a reformulation of HTML 4 in XML 1.0, W3C working draft 4 Oct. 2001 published by W3C. XHTML is suitable for use with alternative platforms to those conventionally used for HTML, such as fixed work stations and personal computers. XHTML differs from WML in that the content is not arranged in a deck of cards but rather in documents more akin to conventional HTML for use with conventional browsers on personal computers. Although the syntax rules and the specifications differ between XHTML and HTML, they contain the same elements and neither of them includes the DO element found in WML. Therefore, it is not possible to provide the previously described options list that can be achieved in WML, for a XHTML browser.

It is an object of the invention to overcome this problem.

SUMMARY OF THE INVENTION

According to the invention there is provided a method of accessing functionalities in hypermedia to be parsed and rendered by a user agent, the hypermedia including at least one element that has a predetermined attribute whereby a dynamically assignable keyboard shortcut for the user agent actuates a predetermined functionality associated with the element, the method comprising: parsing the hypermedia, collating data corresponding to those elements in the hypermedia that support said predetermined attribute, and rendering a display of the collated data.

The invention also includes a browser for hypermedia marked up with at least one element that has a predetermined attribute whereby the actuation by a user of a selected individual keyboard control, actuates a predetermined functionality associated with the element, the browser including software to provide: a parsing process to parse the hypermedia, a process to identify data corresponding to those elements in the hypermedia that support said predetermined attribute, and a process to render a display of the data.

The predetermined attribute may be an accesskey function. The browser may be configured for use with XHTML.

The browser may be provided in a mobile device such as a mobile telephone handset or a PDA.

The invention has the advantage of providing a list of elements independently of the hypermedia containing them, by the use of an attribute such as an accesskey.

The invention also includes a device for rendering hypermedia received from a remote server, the device including a processor for the hypermedia and a user interface including a display device and a keyboard with a plurality of keys operable in a first mode to enter associated alphanumeric data, and operable in a second mode to actuate respective keyboard shortcuts dynamically assigned thereto by elements in the hypermedia, the processor and the display device being operable in a first display configuration to display the hypermedia, the processor being operable to identify elements that define predetermined keyboard shortcuts in the hypermedia, and form an options list containing data associated with the identified elements, and the processor and the display device being operable in a second display configuration to display the options list.

BRIEF DESCRIPTION OF THE DRAWINGS

In order that the invention may be more fully understood, an embodiment will now be described with reference to the accompanying drawings in which.

DETAILED DESCRIPTION

Figure 1:
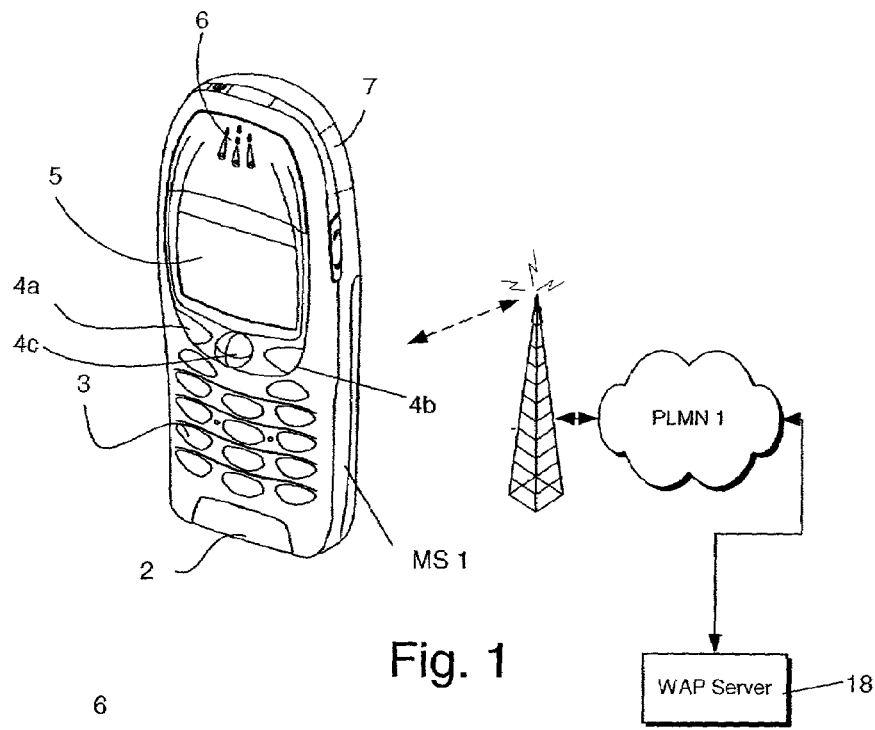
FIG. 1 is a schematic block diagram illustrating a mobile telephone handset that can communicate through a PLMN to a server.

In FIG. 1, a mobile station in the form of a battery driven telephone cellular handset MS 1, is shown schematically in radio communication with PLMN 1. A GSM network is described herein by way of example but it will be understood that other PLMNs could be used, utilizing CDMA, TDMA or other transmission techniques. The mobile handset MS 1, includes a microphone 2, keypad 3, soft keys 4, a liquid crystal display device 5, ear-piece 6 and internal antenna 7. As will be explained in more detail, the handset 1 is enabled with a user agent in the form of a browser for browsing hypermedia.

Figure 2:
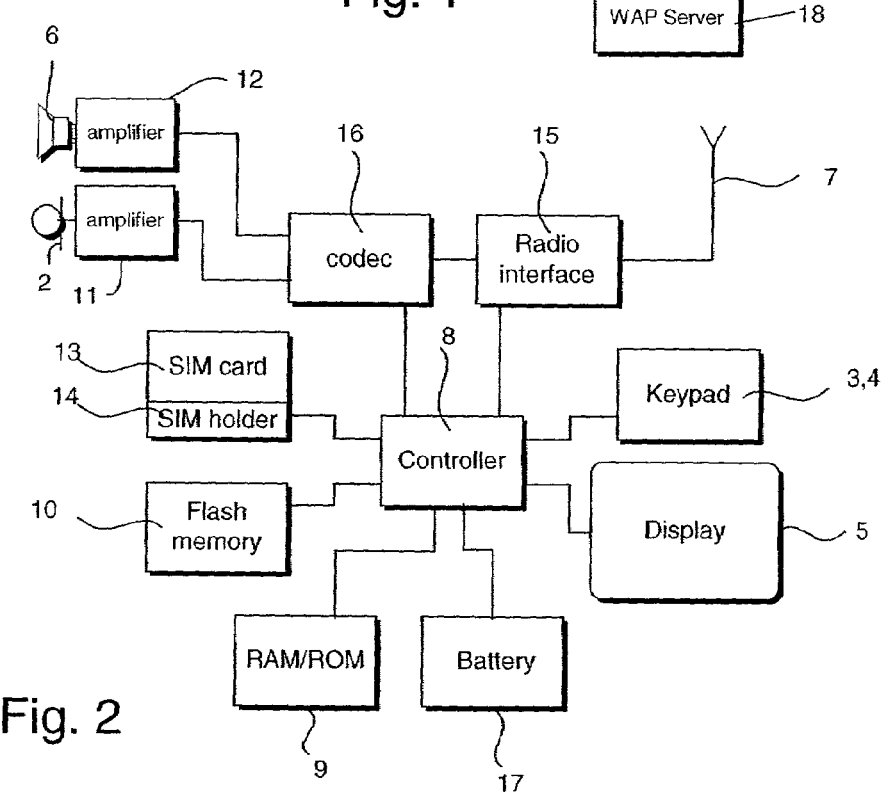
FIG. 2 is a schematic block diagram of a the circuitry of the mobile handset shown in FIG. 1.

The circuitry of the handset MS 1 is shown in more detail in FIG. 2. Signal processing is carried out under the control of a digital micro-controller 8 that has an associated RAM/ROM 9 and flash memory 10. Electrical analog audio signals are produced by microphone 2 and amplified by pre-amplifier 11. Similarly, analog audio signals are fed to the earpiece 6 through an amplifier 12. The micro-controller receives instruction signals from the keypad and so-called soft keys 4 and controls operation of the LCD display 5.

Information concerning the identity of the user is held on a smart card 13 in the form of a GSM SIM card, which contains the usual GSM international mobile subscriber identity and encryption $K_1$ that is used for encoding the radio transmission in a manner well known per se. The SIM card 13 is removably received in a SIM cardholder 14. Radio signals are transmitted and received by means of the antenna 7 connected through a rf stage 15 to a codec 16 configured to process signals under the control of a micro-controller 8. Thus, in use, for speech, the codec 16 receives analog signals from the microphone amplifier 11, digitizes them into a form suitable for transmission and feeds them to the rf stage 15 for transmission through antenna element 7 to PLMN 1 shown in FIG. 1. Similarly, signals received from PLMN I are fed through the antenna element to be demodulated by the rf stage 15 and fed to codec 16 so as to produce analogue signals fed to amplifier 12 and earpiece 6.

The handset 1 is enabled to receive and display hypermedia in a browser. Data can be downloaded to the browser from a server 18 shown in FIG. 1. The server 18 provides hypermedia in the form of pages that can be downloaded to the handset MS I and manipulated for display by means of the keys 3, 4. The server 18 may be accessed through a gateway (not shown), which acts as a proxy server. The handset MS I can access the gateway by dialing a predetermined telephone number.

The hypermedia downloaded from the server 18 may be held in the RAM 9 or the flash memory 10. The microcontroller 8 provides the browser functionality and causes pages to be presented to the user in the browser on the screen of the display 5, and the display can be manipulated by means of the keys 3, 4.

Figure 3:
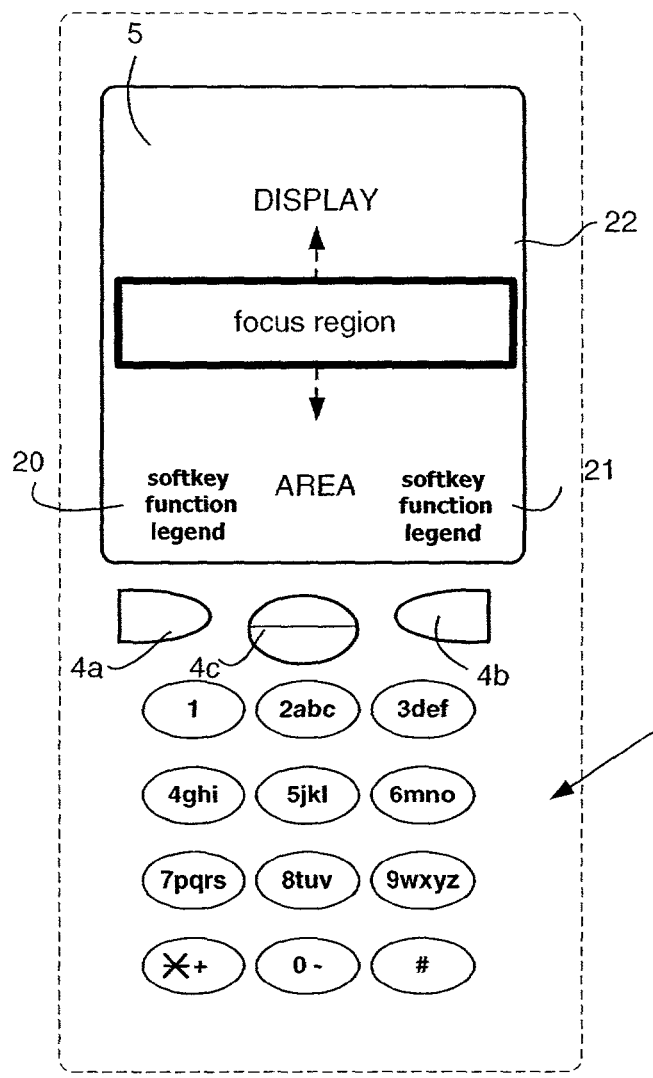
FIG. 3 illustrates schematically that the display of the handset and the associated keys 4.

The functionality of the soft keys 4 will now be described in more detail with reference to FIG. 3. The keys 4 are disposed adjacent the underside of the display 5. The keys 4a, 4b comprise manually depressible buttons. Their functionality can be pre-programmed depending upon the task performed. The function attributed to the keys is displayed on the display 5 as soft key function legends 20, 21 adjacent to the respective keys 4a, 4b.

Figure 4:
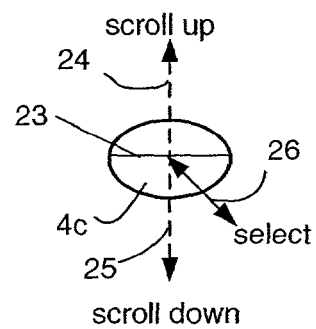
FIG. 4 illustrates a scrolling functionality associated with key 4c.

The key 4c comprises a roller device to perform a scrolling function for the display 5. In use, an active or focus region 22 is provided on the display which, as explained in more detail later, can be moved around the display area. The roller 4c may comprise a 3-way roller, as shown in FIG. 4. The roller may be pushed by the user's finger, to pivot about axis 23. When pushed upwardly, in the direction of arrow 24, a "scroll-up" function is performed. Conversely, when pushed downwardly in the direction of arrow 25 a "scroll-down" function is performed. Additionally, the roller 4c may be manually depressible inwardly of the handset, in the direction of arrow 26, to perform a "select" function. The key 4c may be further configured as a five-way roller, not shown, so as additionally to perform right and left scrolling functions. Alternatively, the key 4c may comprise a rollerball, a touch pad or other navigation device of the type used in laptop computers. In this example, the focus region 22 is delineated by a rectangular box which is moved around the screen of the display 5. However, the focus region can be provided in different ways, such as a region highlighted with a different intensity or color from the rest of the display, an underlining of a menu option or by means of a pointer movable across the display in the manner of a conventional mouse pointer.

It is known in the art that the handset I may be WAP enabled and capable of receiving data in a predetermined channel. For example, in GSMI, a data channel is available at 9.6 kbit/sec. Also, the handset may be configured to receive high speed circuits switch data (HSCSD) according to the GSM recommendations. It would also be possible to use GPRS and formats appropriate to 3G, or other data transmission techniques such as i-mode. The WAP content and its applications are specified in a well known set of content formats based upon familiar www content formats. WAP is disclosed in the wireless application protocol architecture Specification; Version 1.3, published by The Wireless Application Protocol Architecture Working Group, 19 Feb. 2000.

The browser operated by the handset 1, may comprise a micro-browser that acts as a client in the WAP environment for connection to WAP servers.

WML

Conventionally, the browser is configured for use with WML, which comprises a lightweight mark-up language similar to HTML but optimized for handheld mobile terminals. This will now be described in more detail to explain the problem solved by the invention.

In order to accommodate the relatively small display areas provided in mobile devices, a conventional page of HTML is broken down into smaller units known as cards, arranged in a deck.

The deck commences with a prologue and is delimited by a <wml> tag. An example of the syntax of a deck of two cards is set out below.

WML Code Snippet No. 1

```
<wml>
<template>
<do type="prev" label="Backl"><prev/></do>
</template>
<card id="card1" title="Card 1">
<do type="accept" label="Card 2">
   <go href="#card2"/>
   </do>
<p>
   Hello World!
   This is the first card . . .
<p>
</card>
<card id="card2" title="Card 2">
<p>
   This is the second card.
   Goodbye.
</p>
</card>
</wml>
```

Elements and attributes of WML code will now be explained with reference to the example.

Template Element

The <template> element contains optional information about deck-level bindings.

Card Element

The <card> element defines the user interface and processing logic of the deck. As previously mentioned, the deck may include a number of cards and in this example two cards are included.

DO Element

The DO element provides a general mechanism for the user to act upon the current card, and is mapped onto a particular user agent widget, which is determined by the specific user agent i.e. the browser. In the Nokia WAP browser, the DO elements are mapped onto a list in an options menu, which is displayed by operating the right softkey 4a (except for the element <do type="prev" label="Back"><prev/></do>, which is displayed as the softkey function legend 21 for the left softkey 4b, to provide a "Back" functionality associated with the key 4b).

In this example, a DO element triggers a GO element that goes to the universal resource locator (url) of the second card of the deck, and causes the second card to be displayed.

The DO element can be included at the card level or can be included in the template to operate on all cards in the deck.

ANCHOR Element

As with HTML, links can be defined. In WML, the links can be between decks or cards. The links are defined in WML by an ANCHOR element that defines the head of the link. WML also includes an element A, which is a shorthand version of the ANCHOR element. This is not shown in WML code snippet No. 1 above, but will be explained in more detail later.

INPUT Element

Furthermore, WML allows a user to insert text, for example to enter a user name, by means of an element INPUT. This element thus specifies a text entry object, in a similar manner to HTML.

Accesskey Attribute

As in HTML, certain WML elements have an attribute that assigns an access key to the element. In this way, the WML elements can be given a particular focus by operating a predetermined key on the keyboard 3,4 of the device. The attribute is defined in WML as accesskey and is an attribute of the WML elements: ANCHOR, A and INPUT.

An example is given below of the use of the accesskey element in a link using the A element (with A being shown in lower case i.e. "a" below):

<a accesskey="1" href=http://someplace.com/specification/contents.html> Table of Contents </a>

The accesskey functionality is invoked by actuating the key concerned on the keypad. Thus, in this example, when the key "1" on the keypad is pressed, when the link "someplace" is within the focus region 22, the accesskey functionality is invoked and a link to the domain "someplace" is actuated, to locate the contents of a table.

A more detailed description of these WML elements and others is given in "Official Wireless Application Protocol" Wiley, 1999 [ISBN 0-471-32755-7].

As previously mentioned, the small size of the display 5 used in portable devices means that only part of the deck can be displayed at any time so that links contained within the deck are not necessarily visible whilst the user browses the content of the deck. Hitherto, proprietary WML browsers have been configured so that one of the soft keys 4a, 4b is configured to offer the user an options list, in which, links associated with a no element are listed in a separate options screen so that all relevant links can be reviewed by the user without having to browse through the entire deck of cards. WML code snippet number 2 given below illustrates an example of how the DO element can be used in this way.

WML Code Snippet No. 2

```
<wml>
   <card id="Cnnnews" title="CNN News">
   <p>
      <a href="domnews.wml"> Domestic news </a>
      <a href="fornews.wml"> Foreign news </a>
      <a href="sports.wml"> Sports </a>
      <a href="markets.wml"> Markets </a>
   </p>
   <do type="accept" name="home" label="CNN Home">
      <go href="Cnnmain.wml"/>
   </do>
   <do type="accept" name="help" label="CNN Help">
      <go href="helpbusi.wml"/>
   </do>
   </card>
</wml>
```

Figure 5:
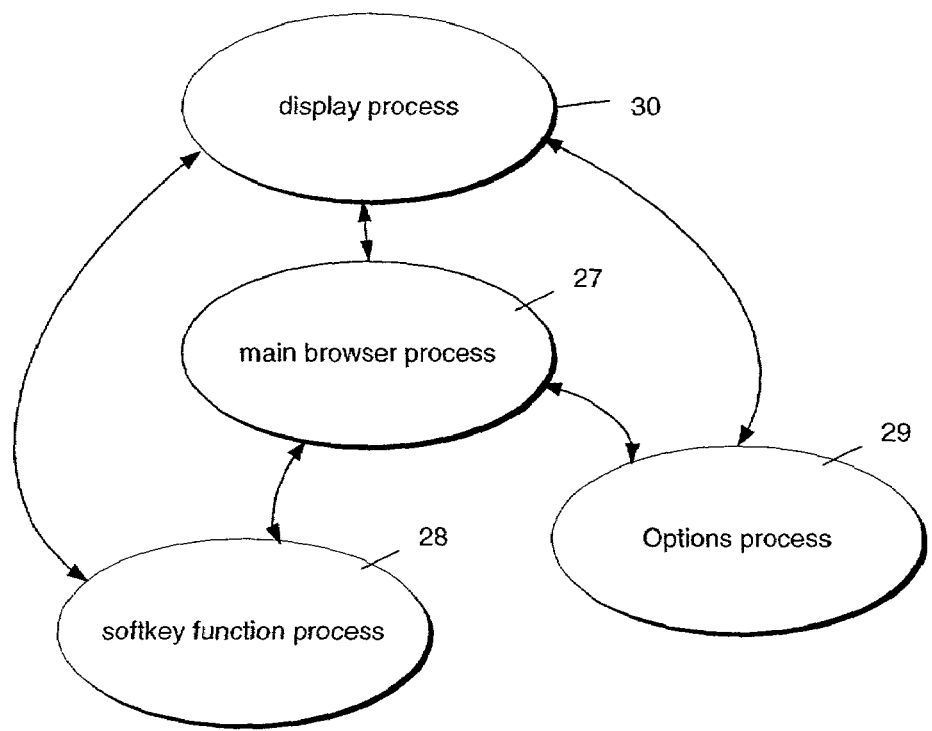
FIG. 5 is a schematic illustration of the process performed by the browser.

The process performed by the browser is shown schematically in FIG. 5 and comprises a main browser process 27, which parses the WML code, soft key function process 28 which responds to actuation of the soft keys 4a-c and an options process 29. The outcome of the processing is rendered to the user by a display process 30 in order to provide a display on the display screen 5.

Figures 6A, 6B:
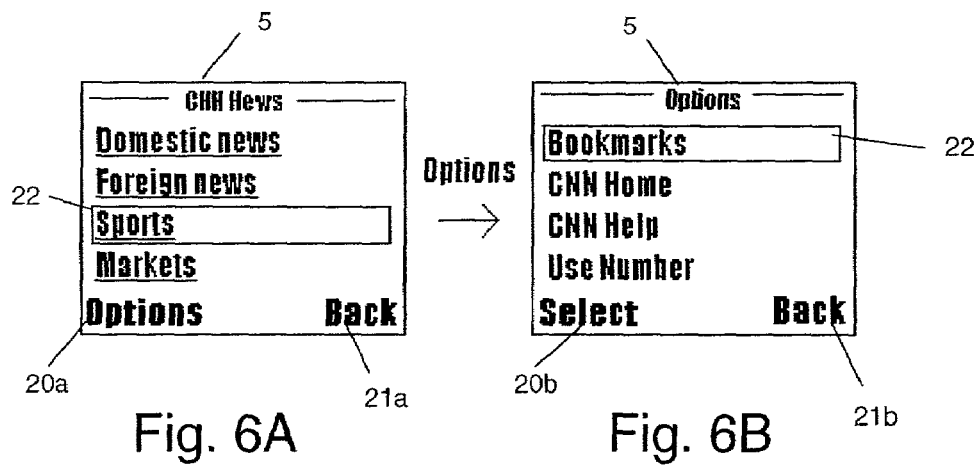
FIGS. 6A and 6B illustrate screen displays for the mobile telephone handset when using either a prior WML browser, or a XHTML browser in accordance with the invention.

These processes render the code of WML code snippet No. 1 to provide a display as shown in FIG. 6A on the display screen 5. The soft key function process 28 designates keys 4a and 4b as "options" and "back" 20a, 21a. When the user operates the "options" key 4a, the display shown in FIG. 6B is provided on the display screen 5, because options process 29 was selected. The options process 29 identifies events in the code snippet 2 that are delineated by the DO element. The DO elements so identified are then rendered in the display of FIG. 6B by the options process 29. The display of FIG. 6B may also include other options that are to be displayed, produced by other means. Thus, in FIG. 6B, the anchors "CNN Home" and "CNN Help" are displayed, because they are associated with DO elements in WML code snippet 2. The display of FIG. 6B also includes "bookmarks" and "use number" 'which are generated separately by means of the browser process 27.

The provision of the DO element items in the options list of FIG. 6B has the advantage that individual links can be provided in the options list and so that the user can identify them without having to browse the entire deck of cards. Thus, by selecting the options display of FIG. 6B, the user can review the links irrespective of the position in the current card.

An example of use of the WML access key will now be described.

WML Code Snippet No. 3

```
<wml>
    <card id="Cnnnews" title="CNN News">
    <p>
        <a accesskey="1" href="domnews.wml"> Domestic
            newsc/a>
        <a accesskey="2" href="fornews.wml"> Foreign news
            </a>
        <a accesskey="3" href="sports.wml"> Sports </a>
        <a accesskey="4" href="markets.wml"> Markets </a>
    </p>
    <do type="accept" name="home" label="CNN Home">
        <go href="Cnnmain.wml"/>
    </do>
    <do type="accept" name="help" label="CNN Help">
        <go href="helpbusi.wml"/>
    </do>
    <card>
</wml>
```

As previously explained, the accesskey attribute allows individual keys of the keypad to be assigned to particular links, to provide a shortcut. Thus, in the described example, the keys 1, 2, 3, and 4 of keypad 3 are assigned individual accesskey functions. The code snippet 3 is processed by the browser in a similar manner to that shown in FIG. 4 and the rendered displays are the same as shown in FIGS. 6A and 6B.

XHTML

It has recently been proposed to develop XHTML browsers for use with mobile devices such as mobile telephone handsets and PDAs. XHTML is an extension of HTML 4, which in turn is an SGML (standard generalized markup language) conforming to international standard ISO 8879 and is widely regarded as a standard publishing language for the World Wide Web. XHTML has been designed with alternate ways of accessing the Internet in mind and the XHTML family is designed with user agent interoperability in mind. However, a disadvantage of XHTML is that it does not include a DO element with functionality as described hereinbefore in relation to WML. This has the disadvantage that if a long text document is provided in XHTML, the user needs to browse through the entire document to determine the available links.

There is no display that corresponds to the display of FIG. 6B, described with reference to WML. The invention seeks to overcome this problem.

XHTML does however include the accesskey attribute. The accesskey functionality may be invoked as previously described.

According to the invention, the accesskey attribute is parsed in such a way as to provide a separate list of links available in the document. An example of XHTML code for use according to the invention is set out below as XHTML code snippet No 1.

XHTML Code Snippet No. 1

```
<html xmlns="http://www.w3.org/1999/xhtml">
<head>
    <title> CNN News </title>
</head>
<body>
<p>
    1. <a href="domnews.html" accesskey="1"> Domestic
        news </a><br/>
    2. <a href="fornews.html" accesskey="2"> Foreign
        news </a><br/>
    3. <a href="sports.html" accesskey="3"> Sports
        </a><br/>
    4. <a href="markets.html" accesskey="4"> Markets
        </a><br/>
    <a href="cnnmain.html" accesskey="5"
        style="visibility: hidden"> CNN Home </a>
    <a href="helpbusi.html" accesskey="6"
        style="visibility: hidden"> CNN Help </a>
</p>
</body>
</html>
```

According to the invention, the browser process 27 of FIG. 5 is configured to parse XHTML hypermedia and the display process 30 renders a display corresponding to FIGS. 6A and 6B. According to the invention, links that are marked with accesskey attributes are provided in the options display of FIG. 6B. Thus, the previously described WML functionality is provided in XHTML but with out the use of a DO element.

In the case where style="visibility:hidden" is defined, the actual link will not be visible in the display, but will still be included in the options list. This is identical to WML DO element behavior, which does not have any visible rendering within the document itself The other accesskey cases in the above code snippet, 'without "visibility:hidden" show how the invention is simpler and more powerful than WML DO, since it combines both the <a> (anchor) functionality and DO functionality.

When style="visibility:hidden" is set for a particular accesskey so that it is not visible in FIG. 6A, its associated link can however be selected by performing a relatively long key press of the associated key on the keyboard. For example, in XHTML code snippet No. 1, the link "CNN Home" associated with accesskey="5" is hidden in the display of FIG. 6 but can selected by a long press of the 5 key of the keyboard.

Figure 7:
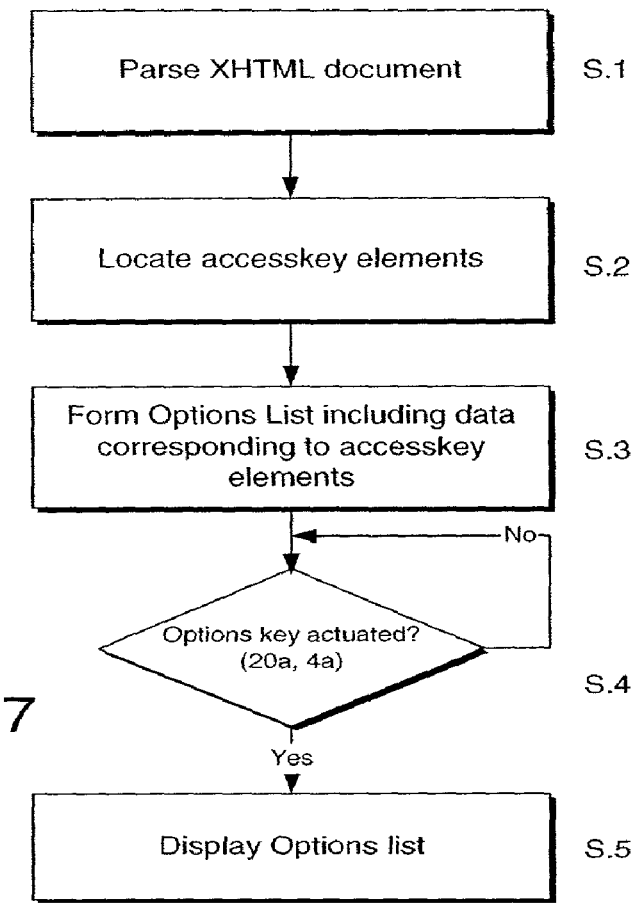
FIG. 7 is a schematic flow diagram of the process steps carried out when parsing an XHTML document in accordance with the invention.

The process performed by the browser will now be described in more detail with reference to FIG. 7. At step S1, the XHTML document is parsed and at step S2, items that have been marked with an accesskey element are identified. The links associated with the elements naming an accesskey attribute are then included in an options list at step S3. As previously explained, the option process 29 shown in FIG. 5 may produce an options list that includes not only the access key elements but also other links which are provided by other processes, such as "bookmarks" and "use number".

When the user operates the options key, namely soft key 4a with functionality 20a shown in FIG. 6A, the options list of FIG. 6B is displayed as shown at step S5.

Individual links from the display of FIG. 6B can then be selected by scrolling the focus region 22 up or down with key 4c, in the direction of arrows 24, 25 (FIG. 4) in order to select a particular link. The link may then be actuated by depression of the key 4c in the direction of arrow 26. Alternatively, another key on the handset may be used for actuation of the link, such as the usual "send" or "place call" key (not shown).

Referring in more detail to XHTML code snippet No. 1, it will be seen that the accesskey functions 1 and 2 have been assigned to the link corresponding to "CNN Home" and "CNN Help" respectively and hence these two links are displayed in the options list of FIG. 6B. It will be seen that the style has been set to "visibility:hidden" with a result that link associated with the accesskey functionality is suppressed in the display of FIG. 6A. The "visibility:hidden" attribute is a feature of XHTML and defines the particular template that is to be used for display of the element.

Thus, the user can access these links independently of their location in the XHTML page and independently of the position of the page in the XHTML browser.

This advantage will be seen with greater clarity with reference to the following XHTML code snippet and its corresponding display.

XHTML Code Snippet No. 2

```
<html xmlns="http://www.w3.org/1999/xhtml">
    <head>
    <title> Specimen page of textual information
        containing linksc/title>
    </head>
<body>
    <p>
    <a href="morenews.html" accesskey="l"> more news
        </a>
    </p>
    <p> This is an example of a long item of text which fills up all of the display screen of a mobile telephone handset and which cannot all be displayed at once. The item of text contains so many words that it would not be possible to fit it all within the limited display screen size usually found on a mobile telephone handset. </p>
    <p> Some items such as news items, require a significant number of words to describe the details of the story that is being conveyed to the reader. </p>
    <p> The item may include links to other pages, such as a link to a page with information relating to "sports", the link being provided below. </p>
    <p>
    <a href="sports.html" accesskey="2"> Sports </a>
    <a href="anotherlink.html"> Another link </a></p>
    <p> The link may be located in the text at a particular point dependent upon the context, or at the beginning or the end. </p>
    <p> The item may also include graphics and other items such as tables. </p>
    <p> Some more text is hereby provided after which some more links are shown. When browsing the page, the user cannot tell whether there are links in the text or whether there are more links at the end, unless the entire page is viewed. </p>
    <p>
    <a href="homepage.html" accesskey="3"> homepage
        </a>
    <a href="markets.html" accesskey="4"> markets </a>
    </p>
    </body>
</html>
```

Figure 8:
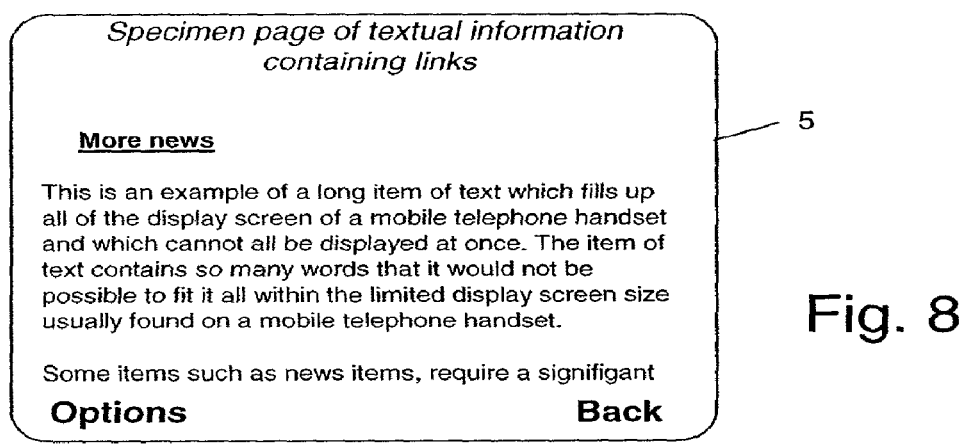
FIG. 8 is a screen display for a second example of the invention.
Figure 9:
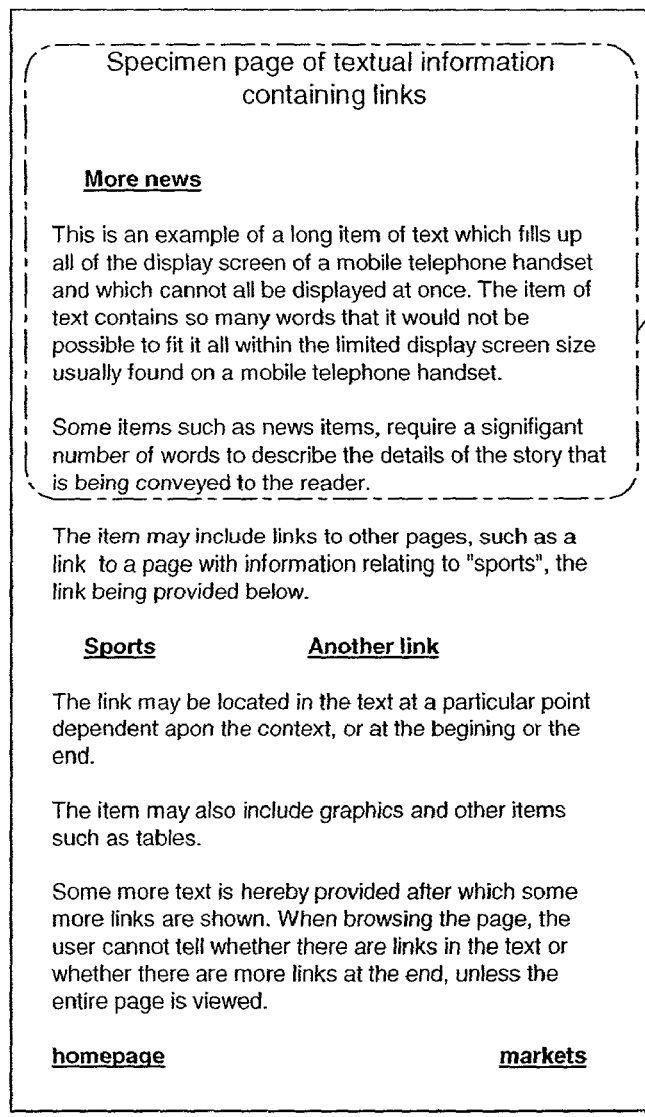
FIG. 9 is a schematic illustration of an XHTML document.
Figure 10:
FIG. 10 is a schematic illustration of the options list provided in accordance with the invention for the XHTML document shown in FIG. 9.

The display corresponding to the code is shown in FIGS. 8, 9 and 10. The XHTML code is parsed and processed as shown in FIG. 7 and the initial display provided on display screen 5 is shown in FIG. 8. FIG. 9 illustrates schematically that the entire HTML document cannot be displayed in the relatively small area of the screen 5 but that the document can be scrolled using the soft key 4c so that all of the XHTML document can be made available for display.

It will be seen that in the display of FIG. 8, only one of the available links is initially visible to the user, namely "More News". However, from the display of FIG. 9, it will be seen that there are four further links that are available to the user when the document is scrolled. The links "Sports" "Homepage" and "Markets" are each provided with an individual accesskey code. As a result, when the options key 4a, 20a is actuated (Step S4 of FIG. 7) the links that have been marked with accesskey elements are displayed in a separate options list as shown in FIG. 2. Thus, the user is provided with a convenient list of all the links with associated access keys irrespective of the position of the document in the browser, thus overcoming the need to scroll through the entire document to identify all of the links.

It will be noted that not all of the links need be included in the options list of FIG. 10. The "another link" shown in FIG. 9 is not marked with an accesskey function in the XHTML code and as a result is not included in the display of FIG. 10. This is under the control of the programmer.

Many modifications and variations of the invention falling 'within the spirit and scope of the claims are possible. For example, because the accesskey functionality is also available in WML and SGML, the invention is not restricted to XHTML but can be used with other mark up languages.

The invention claimed is:

1. A method of accessing functionalities in a hypermedia document to be parsed and rendered by a user agent, the hypermedia document including at least one element that has a predetermined attribute whereby a dynamically assignable keyboard shortcut for the user agent actuates a predetermined functionality associated with the at least one element, the method comprising:
    parsing the hypermedia document;
    in response to identifying an element in the hypermedia document that has been assigned a keyboard shortcut in the hypermedia document using said predetermined attribute, collating data corresponding to the element; and
    rendering a display of collated data for at least one element that has been assigned a keyboard shortcut using said predetermined attribute in the hypermedia document, instead of the hypermedia document.

2. A method according to claim 1 wherein the predetermined attribute comprises accesskey operability for assigning a particular control key for the user agent to the element.

3. A method according to claim 2 including rendering the hypermedia, and operating a control of the user agent to render the collated data instead of the hypermedia.

4. A method according to claim 3 including making a selection from the collated data to select said predetermined functionality.

5. A method according to claim 1 wherein the parsing and collating is performed by a browser.

6. A method according to claim 1 wherein the hypermedia comprises an extensible hypertext mark up language (XHTML) document.

7. A device comprising a processor configured to:
  run a browser to render hypermedia that includes at least one element that has a predetermined attribute whereby a dynamically assignable keyboard shortcut actuates a predetermined functionality associated with the at least one element;
  parse a hypermedia document;
  collate data corresponding to an element in response to identifying the element in the hypermedia document that has been assigned a keyboard shortcut in the hypermedia document using said predetermined attribute; and
  cause a display of collated data for at least one element that has been assigned a keyboard shortcut using said predetermined attribute in the hypermedia document, instead of the hypermedia document.

8. A device according to claim 7, wherein the browser utilizes extensible hypertext mark up language (XHTML).

9. A mobile device including a browser as claimed in claim 7.

10. A device according to claim 7 wherein the predetermined attribute is an accesskey function.

11. A device for rendering a hypermedia document received from a remote server, the device including a processor for processing the hypermedia document and a user interface including a display device and a keyboard with a plurality of keys configured in a first mode to enter associated alphanumeric data, and configured in a second mode to actuate respective keyboard shortcuts dynamically assigned thereto by elements in the hypermedia document, and wherein;
  the processor and the display device being configured in a first display configuration to display the hypermedia document;
  the processor being configured to, responsive to an identification of an element that defines predetermined keyboard shortcuts in the hypermedia document, collate data associated with the identified element, and form an options list containing collated data associated with identified elements; and
  the processor and the display device being configured in a second display configuration to display the options list.

12. A device according to claim 11 wherein the data associated with the identified elements comprise links to other hypermedia locations, and the keyboard is operable in the second display configuration to select and actuate one of the links.

13. A device according to claim 11 wherein the keyboard is operable to switch between the first display configuration in which a least a portion of hypermedia in the hypermedia document is displayed and the second configuration in which the options list is displayed.

14. A device according to claim 11 wherein the display device is configured to scroll the displayed hypermedia in said first display configuration whereby the display can be scrolled through different scrolling positions, and the options list display for the second configuration is selectable independently of the scrolling position of the first display configuration.

15. A device according to claim 14 including a scrolling device to scroll the display of hypermedia in the first configuration.

16. A device according to claim 13 wherein the keys of the keyboard are operable with a relatively short key-press in the first mode and a relatively long key-press in the second mode.

17. A device according to claim 11 wherein the elements have an accesskey keyboard shortcut function.

18. A device according to claim 17 wherein numbering associated with the accesskey keyboard shortcut function is hidden in the display of hypermedia in the first display configuration.

19. A computer readable medium storing computer executable code that when executed by a processor performs the following:
  parsing a hypermedia document;
  in response to identifying an element in the hypermedia document that has been assigned a keyboard shortcut in the hypermedia document using said predetermined attribute, collate data corresponding to the element; and
  rendering a display of collated data, for at least one element that has been assigned a keyboard shortcut using said predetermined attribute in the hypermedia document, instead of the hypermedia document.

20. A computer program product, the computer program product comprising at least one computer-readable storage medium having computer-readable program code portions stored therein, the computer-readable program code portions comprising:
  a first executable portion configured to parse a hypermedia document;
  a second executable portion configured to collate data corresponding to an element in response to identifying the element that defines a predetermined keyboard shortcut in the hypermedia document; and
  a third executable portion configured to render a display of collated data for at least one element that has been assigned a keyboard shortcut using said predetermined attribute in the hypermedia document instead of the hypermedia document.

21. A method of collating and providing a display of mark up language elements embedded in a hypermedia document that is loaded by a browser and at least partly rendered in a display of a mobile device, comprising:
  parsing, using a processor of the mobile device, mark-up code of the hypermedia document;
  collating data corresponding to at least one mark up code element in response to identifying the element in the hypermedia document having an accesskey attribute; and
  rendering a list of the identified elements instead of the hypermedia document in said display.

22. A method of claim 21 further comprising rendering the hypermedia document, and wherein the rendering of the display including a list of the identified elements, instead of the hypermedia document is performed in response to the operation of a control of the mobile device.

23. A method of claim 21 further comprising
  making a selection of an identified element in the list to select a functionality associated with the accesskey attribute.

24. A method of claim 21, wherein the parsing and the collating is done by the browser.

25. A method of claim 21, wherein the hypermedia document comprises an extensible hypertext mark up language (XHTML) document.

26. A device comprising:
  a processor configured to run a browser to load a hypermedia document; and
  the processor further being configured to parse mark-up code of the hypermedia document at least partly displayed in a display; and collate data corresponding to at least one mark up code element in response to identifying at least one mark up code element in the hypermedia document having been assigned an accesskey attribute and render a list including the identified elements for display, instead of the hypermedia document, in said display.

27. A device for rendering a hypermedia document, the device comprising:

a processor configured to process the hypermedia document and configured in a first mode to receive alphanumeric data in response to actuation of one or more keys, and configured in a second mode to receive respective keyboard shortcuts dynamically assigned to respective keys by elements in the hypermedia document, and wherein;

the processor being configured in a first display configuration to cause display of at least a portion of hypermedia in the hypermedia document;

the processor being configured, responsive to identification of an element that defines a predetermined keyboard shortcuts in the hypermedia document, collate data associated with the identified element, and form an options list containing collated data associated with identified elements; and the processor being configured in a second display configuration to cause display of the options list.

28. A method according to claim 1, wherein the predetermined attribute comprises link data associated with the element in a list and wherein the collated data comprises the list.

29. A device according to claim 7, wherein the predetermined attribute comprises link data associated with the element in a list and wherein the collated data comprises the list.

30. A device according to claim 11, wherein the predetermined keyboard shortcuts comprises link data associated with the element in a list and wherein the collate data comprises the list.

31. A computer readable medium according to claim 19, wherein the predetermined attribute comprises link data associated with the element in a list and wherein the collated data comprises the list.

32. A computer program product according to claim 20, wherein the predetermined keyboard shortcut comprises link data associated with the element in a list and wherein the collated data comprises the list.

33. A method of claim 21, wherein the accesskey attribute comprises a link corresponding to the at least one mark up code element in the list.

34. A device according to claim 26, wherein the accesskey attribute comprises a link corresponding to the at least one mark up code element in the list.

35. A device according to claim 27, wherein the predetermined keyboard shortcuts comprises link data associated with the element and wherein the second display configuration comprises display of the options list instead of the hypermedia document.

* * * * *

UNITED STATES PATENT AND TRADEMARK OFFICE
CERTIFICATE OF CORRECTION

PATENT NO. : 7,610,356 B2  Page 1 of 1
APPLICATION NO. : 10/041610
DATED : October 27, 2009
INVENTOR(S) : Aarts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2020 days.

Signed and Sealed this

Twelfth Day of October, 2010

David J. Kappos
*Director of the United States Patent and Trademark Office*